Patented Nov. 1, 1938

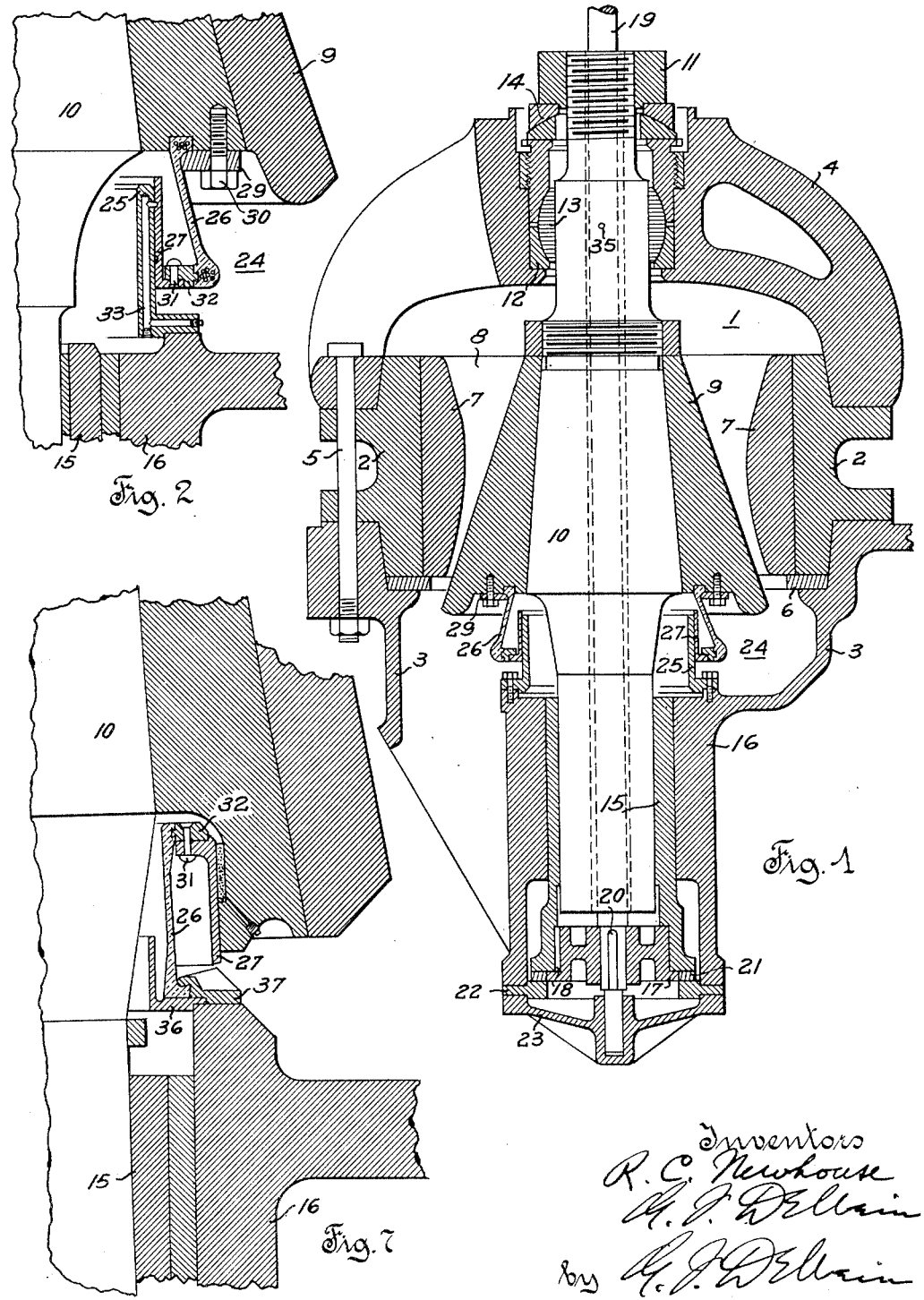

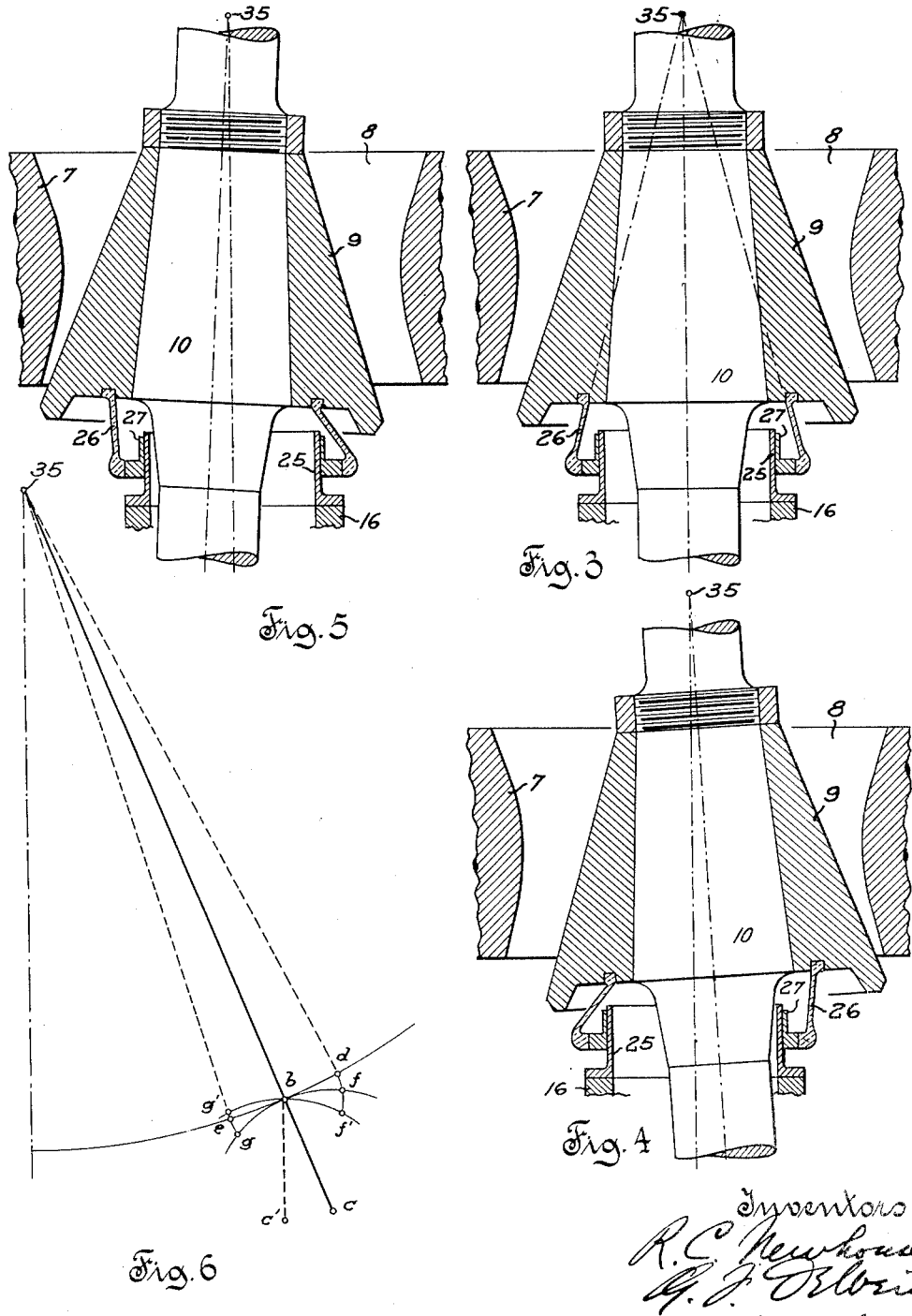

2,134,885

UNITED STATES PATENT OFFICE 2,134,885

DUST SEAL FOR GYRATORY CRUSHERS

Ray C. Newhouse, Wauwatosa, and George F. De Wein, Milwaukee, Wis., assignors to Allis-Chalmers Manufacturing Company, Milwaukee, Wis., a corporation of Delaware Application August 25, 1934, Serial No. 741,404

8 Claims. (Cl. 83—10)

This invention relates, in general, to dust excluding devices and more particularly to improvements in sealing means for effectively excluding dust and gritty material from such mechanism as the operating and driving elements of gyratory crushers.

Gyratory crusher driving elements are ordinarily subjected to the detrimental action of the dust and gritty material prevalent during crushing operations. For excluding dust from such apparatus, it has heretofore been proposed to provide sealing members of various types between the gyratory crushing head and a portion of the crusher.

One proposed type of sealing member is constituted by a metallic ring that at one edge engages circumferentially with either the fixed portion of the crusher or the movable head and simultaneously engages at its other edge, which is provided with a spherical surface, with a spherical annular channel formed in the other of said crushing members. This type of sealing means has not been found to be entirely satisfactory, primarily because of the fact that clearances are required between the metal ring and the other parts of the crusher to permit relative movements thereof resulting from the gyratory motion of the crushing head. To partially offset the tendencies toward leakage of dust through the clearances of such sealing means, the use of grease at the sealing edges of the ring has been found to be beneficial, but even recourse to this aid does not assure that at all times the seal will effectively exclude dust from the operating elements of the crusher.

It is the principal object of the present invention, therefore, to provide an improved sealing means for effectively excluding dust from the operating mechanism of a gyratory crusher or the like.

A more general object of the invention to to provide an improved dust excluding sealing means for the bearing of a shaft journaled eccentrically for gyratory movement.

Another object of the invention is to provide a sealing means for effecting dust-tight connection between a stationary member and a member mounted to gyrate and to rotate in either direction.

Another object of the invention is to provide a sealing means for the operating eccentric of a gyratory shaft that includes a flexible curtain so arranged as to conform with the movement of the shaft with minimum deformation of the curtain.

Another object of the invention is to provide on a sealing means for a gyratory crusher shaft, a flexible curtain rigidly attached to one element of the crusher and having a rotatable and slidable connection with another element thereof.

A further object of the invention is to provide for opposing the entrance of dust between a sealing means and a cooperating relatively rotatable element by causing grease to flow therebetween in a direction opposite to the direction of flow of entering dust.

According to the present invention, the operating mechanism of a gyratory crusher is provided with an annular, flexible, dust-excluding shield attached at one end to one element of the crusher and having at its other end a sleeve in rotatable and slidable engagement with another, relatively movable element of the crusher. The flexible shield is so shaped that its ends may conform to the movements of the respective crushing elements without undue deformation of the material of the shield or cramping of the rotatable sleeve. To insure against leakage of dust, means are provided for causing a flow of grease between the shield sleeve and its cooperating element in direction opposing the entrance of dust therebetween.

Other objects and advantages of this invention will become apparent upon further consideration of this specification in conjunction with the drawings forming a part hereof and on which like reference characters have been applied to indicate like parts throughout the various views.

Fig. 1 is a view in longitudinal, central section of a crusher having a dust excluding shield embodying the present invention associated with the gyratory head thereof, the close side of the crusher being at the left.

Fig. 2 is a fragmentary view in longitudinal section corresponding to Fig. 1 but showing the gyratory head in central position, and illustrating features of the invention in greater detail.

Fig. 3 is a fragmentary more or less diagrammatic view in longitudinal section based on Figs. 1 and 2 and showing the gyratory head in central position, lines being drawn from the fulcrum point to indicate the position taken by the line elements of the dust shield.

Fig. 4 is a fragmentary more or less diagrammatic view in longitudinal section conforming to Fig. 3, and showing the close side of the gyratory head at the right.

Fig. 5 is a fragmentary more or less diagrammatic view in longitudinal section conforming to Fig. 3 and showing the open side of the gyratory head at the right.

Fig. 6 is a diagram which, taken with Figs. 3, 4 and 5, shows the action of the flexible shield of the present invention in comparison with the action of a shield of cylindrical shape.

Fig. 7 is a fragmentary view in longitudinal section showing a modified arrangement of the composite dust shield of Figs. 1 and 2, required for the particular type of crusher shown in this figure, the close side of the head being shown at the right.

Referring to the drawings by characters of reference and particularly to Fig. 1, the gyratory crusher 1 there illustrated includes a top shell 2 having secured thereto by means of bolts 5, a spider 4 at its upper side, and a bottom shell 3 at its lower side. Within the top shell 2 is mounted a concave 7 that cooperates with a gyratory head 9 to form a crushing chamber 8. The gyratory head 9 is carried by a hollow main shaft 10 that is suspended from the spider 4 and is engaged by an eccentric driving means in the lower part of the bottom shell 3.

The bottom shell is provided near its top with an internal ledge supporting an annular member 6 extending inwardly of the inner cylindrical surface of the top shell, for the purpose of supporting the concave 7 in proper relation with respect to the gyratory head 9 that is mounted on an intermediate portion of the main shaft 10. The head and main shaft are suspended from the spider 4 by means of a suspension nut 11 reacting on spherical bearings 14 located in the upper part of the spider. By means of the suspension nut 11, the shaft and head may be adjusted vertically relative to the concave 7 in well known manner to regulate the width of the crushing chamber 8. A bushing 13 having an outer spherical surface provides a journal for the upper portion of the main shaft and cooperates with a bushing 12 having a complementary inner spherical surface and mounted in the spider 4. By reason of the spherical mounting of the upper end of the shaft 10 in the spider 4, the shaft is constrained to gyrate about a fulcrum point 35 at the center of generation of the spherical bearing surfaces.

The lower portion of the main shaft 10 which engages the eccentric driving means, is received within an offset cylindrical bore of an eccentric 15 rotatably mounted in a concentric bearing 16 formed in the bottom shell 3. The eccentric 15 is connected to a drive shaft 19, located within and extending through the hollow main shaft 10, by means of a drive plate 17 inwardly keyed by means of key 20 to the drive shaft 19 and outwardly keyed by means of a key 18 to the eccentric 15. A thrust bearing 21 for the eccentric 15 engages the bottom edge of the eccentric and is positioned between the eccentric and an annular member 22 carried by a bottom plate 23 and clamped thereby securely to the lower end of the bearing 16 of the eccentric.

The oil necessary to be supplied to the top of the eccentric for lubricating the external surface of the bottom portion of the main shaft and the external surface of the eccentric 15, is introduced in well known manner and requires for its confinement above the eccentric, a pipe extension 25 that is secured to the top of the eccentric hub 16 by means such as the bolts shown.

To prevent dust and gritty material from entering the oil at the top of the eccentric and detrimentally affecting the bearing surfaces of the eccentric and the shaft, the crusher is provided according to the present invention with a dust excluding shield 24 forming a dust-tight connection between the stationary pipe extension 25 and the movable crushing head 9. The dust excluding member or shield 24 cooperates directly with the head 9 to which it is clamped and is arranged for relative rotation between it and the pipe extension 25 as well as for vertical adjustment of the head while retaining circumferential sealing with the pipe extension 25.

Now referring to Fig. 2, wherein the dust excluding member 24 of Fig. 1 is shown to an enlarged scale, it is seen that the sealing means 24 comprises a flexible curtain 26 that is clamped at one edge to the head 9 by means of a clamping ring 29 that engages and clamps this end of the curtain 26 in fluid tight relation to the head 9. The other end of the curtain 26 forming the dust excluding member 24 is provided with a flanged sleeve ring 27 that encircles the pipe extension 25. The curtain 26 and sleeve ring 27 are connected through the intermediary of a separate dovetailed ring 32 which is joined to the curtain 26 by any suitable means after molding of the curtain and is connected to the ring 27 by means of bolts 31. The composite dust shield 24 therefore may be said to be comprised of an end connected flexible member 26 and a sleeve ring 27, the separate intermediate ring 32 being provided primarily to facilitate end connection between the curtain 26 and the sleeve ring 27.

The flexible curtain 26 is in the preferred form comprised of rubber much like the wearing rubber in an automobile tire, and the ring 32 may be permanently connected to the rubber curtain 26 at the time of molding thereof, whereupon the curtain so constituted may be end connected through the intermediary of the flange on the sleeve ring 27 as explained.

Figs. 1 and 2 show the particular form and arrangement in the crusher of the flexible curtain 26 which has the advantages of providing least deformation of the curtain 26 and illustrates how the sleeve ring 27 maintains effective circumferential sealing with the pipe extension 25. As shown, the sleeve ring 27 is fitted closely to the exterior of the pipe extension 25 but in such manner as to permit rotation of the sleeve ring upon the pipe extension during operation of the crusher without exerting destructive twisting action upon the rubber curtain 26 and to permit vertical movement of the sleeve ring upon the pipe extension when the gyratory head 9 is adjusted vertically. However, in addition to the circumferential sealing provided between the sleeve ring and the pipe extension by this metal to metal seal, it is desirable to oppose any dust which may tend to enter along the surfaces between the sleeve ring 27 and pipe extension 25 by a deterring counterflow of grease in order that more effective sealing may be attained thereat. For this purpose the pipe extension 25 is provided with a grease passage 33 having an opening near the top of the pipe adjacent to the sleeve 27, from which grease may be caused to flow downwardly or counter to any incoming dust. These latter details have not been shown in Fig. 1 because of the small scale to which it is drawn.

The principle underlying the particular form and arrangement of the flexible curtain 26 will now be explained with reference to Figs. 3, 4, 5 and 6 of the drawings, the diagram of Fig. 6 being read in connection with Figs. 3, 4 and 5.

When it is in unstressed condition, the rubber curtain 26 is in the shape of a hollow frustum of a cone of such dimensions that, with the curtain in operating position as shown in Fig. 3, the apex of the defining cone coincides with the fulcrum point 35 about which the shaft 10 gyrates, the outline of the cone being indicated by the broken lines. However, when the curtain 26 is secured in operating position beneath the head 9 of the crusher, it is always distorted to accommodate the offset position of the crusher head relative to the frame of the crusher. The form taken by the curtain 26 may be referred to its line elements, that is, its elements running longitudinally of its wall and specifically those line elements which are in neutral positions within said wall. Fig. 3 has been drawn on a plane passing diametrically through the head 9 of the crusher, all points of which are shown located equal distances from the adjacent surface of the concave 7. Thus, in Fig. 3, the two diverging broken lines drawn from fulcrum point 35 when extended within the boundary of the walls of the curtain 26 indicate line elements which are in neutral positions therein.

These line elements of Fig. 3 are represented in Fig. 6 by the line $b, c$. The terminal points for these lines as depicted by line $b, c$ are located in the following planes. The point $b$ is in a transverse plane through the head 9 in which all points in the curtain 26 move in accordance with the gyratory movements of the head. The point $c$ is in a transverse plane through the head 9 and including the bead on the lower portion of the curtain 26 with reference to which the maximum movements of the point $b$ occurs. Analysis of the effect and directions of movement of the neutral elements of the particular form of curtain shown, during operation of the crusher will now be made in connection with Fig. 6 with reference to Figs. 4 and 5, which latter figures indicate the throw of the head in greatly exaggerated manner for the sake of clearness.

Each of these neutral line elements $b, c$ will, when the head is in closed position as indicated at the right of Fig. 4, have to shift to take the direction of line $f, c$, the terminal point of $c$ for this line remaining preferably in the same position and the length of the line from said point $c$ being taken as the length of the line $b, c$ of Fig. 6. However, the other terminus of the line in closed position must lie in an arc taken about the fulcrum point 35 of the crusher and at a point $d$ in said arc. The material of the curtain 26 must therefore undergo a stretching by an amount indicated by the distance between $f$ and $d$.

The neutral line element $b, c$ will, when at the side of the head in the open position as shown at the right of Fig. 5, have to shift to the direction of line $g, c$, the terminal point $c$ for the line again remaining in the same position and the length of the line from said point $c$ being again taken as the length of line $b, c$. However, the other terminus of the line in its new position must again lie in an arc taken about the fulcrum point 35 of the crusher and at a point $e$ in said arc. The material of the curtain 26 in said neutral line element must therefore undergo a stretching by an amount indicated by the distance between $g$ and $e$. The distances $g, e$ and $f, d$ in addition to both indicating stretching of the neutral line elements when in the closed and the open position, are seen to be of equal lengths in Fig. 6, thus indicating equal stretching effects at these elements of the curtain when located at the closed and at the open sides of the crushing head. Consequently, the curtain exerts substantially balanced forces upon the opposite sides of the sleeve ring 27 in such manner that cramping or cocking of the sleeve ring upon the pipe extension 25 is avoided and thus freedom of movement between the ring and the pipe is not interfered with.

For purposes of comparison, Fig. 6 is so drawn as to illustrate also the same length of neutral line elements in a curtain the sides of which are directed vertically to distinguish from the inclined sides and neutral line elements of the preferred form of curtain shown in Figs. 1 and 2. For simplicity of illustration, the point $b$ is taken as the upper end of the vertical neutral line element and the lower end is indicated by $c'$, which lies in a plane lower than the plane first considered containing point $c$. This makes it possible to use the common point $b$ for both the previously discussed neutral line element $b$, $c$, and for the new equal length vertical line element $b, c'$. We find under the same conditions described in connection with the neutral line elements $b, c$ that the vertical neutral line element $b, c'$ will take the position of $c', f'$ at the closed side indicated at the right of Fig. 4, and $c', g'$ at the open side indicated at the right of Fig. 5. The material of the curtain in line element $c', f'$ in the closed position will undergo stretching of an amount $f', d$ while the material in the line element $c', g'$ at the same moment at the opposite open side of the crusher will undergo compression by an amount indicated by line $g', e$.

The effect on the material of the curtain now being considered in these line elements at the closed and open sides of the crusher is seen to be both opposite in sense and different in magnitude. With this form of curtain, the combined forces at opposite sides thereof tend to cock the sleeve ring 27 upwardly at each point of its rotative movement at the closed side of the crusher. Such unbalanced forces result in binding or cramping of the sleeve ring 27 on the pipe extension 25 which interferes with relative rotational movement thereof and consequently causes the curtain to be subjected to excessive twisting forces.

Similar results, of different degree are obtained with curtains having neutral line elements arranged at other angles of inclination to the line elements of the curtain 26 of the dust shield embodying the present invention.

The form of curtain shown in Figs. 1 and 2 which is described as being desirable and necessary to reduce the amount of deformation thereof to a minimum may also be used in a crusher requiring an opposite arrangement of the dust shield from that shown applied to the crusher of Figs. 1 and 2 with the same desired effects. In the crusher of Fig. 7 the dust shield may be characterized as of the upstanding type as distinguished from the depending type of dust shield shown in Figs. 1 and 2. The flexible curtain 26 is clamped through the intermediary of a ring 36 supported from the eccentric hub 16 by means of a clamping ring 37 secured to the eccentric hub 16 in such manner as to clamp this end of the upstanding flexible curtain 26 in fluid tight connection with the eccentric hub 16 which is one of a plurality of relatively gyrating parts of a crusher. The composite dust shield of this figure also includes a flanged sleeve ring 27, the flange of which is connected in fluid tight manner by means of bolts 31 to a ring 32 which is fixedly united in dovetailed relation to the curtain 26.

Circumferential sealing in this form of the invention is provided between the sleeve ring 27 and a cylindrical portion formed inwardly at the bottom of the head 9. The adjacent surface of the inwardly formed cylindrical portion of the head 9 is undercut to provide an annular grease receiving pocket bridged by the sleeve ring 27, and which is intended to be so supplied with grease that a head on said grease exists at all times tending to effect counter flow of grease to effectively prevent entrance of dust and to maintain the desired effective circumferential sealing between the sleeve ring 27 and the head as explained in connection with the grease inlet passage 33 of Fig. 2. The clamping ring 37 may be provided with circumferential spaced radially directed sloping stops for coaction with the lower portion or end of the sleeve ring 27.

It is to be understood that the neutral line elements of the curtain 26 of Fig. 7 are each substantially in a line drawn from the fulcrum point of the crusher when the crusher head is considered as centrally placed within the crusher. Fig. 7 shows the position of the flexible curtain 26 having such neutral line elements under the condition prevailing at the closed side of the crusher, and shows the inclination of the neutral line elements of the curtain when shifted in the plane of the figure to the right thereof which represents the closed position. It is to be further understood in connection with the upstanding type of dust excluding member of Fig. 7 that it is desirable to so position the neutral line elements of the curtain as to make them substantially coincident with lines drawn from the fulcrum point of the crusher into the medial line of the walls of the curtain.

Each of the two types of dust excluding shields accommodates for backward and forward rotation of the head under conditions when the crusher is operating under load and when it is operating idle respectively, and also accommodates for the throw of gyration. The determination for the form of the flexible curtain was made and the determined form applies strictly only when the head is in its mean operating position. However, the head may be adjusted vertically for changing the size of the crushed material to be discharged from the crushing chamber 8 without materially affecting the action of the flexible curtain 26 and with minimum tendency for cocking of the sleeve ring 27.

The composite dust shield of this invention may be readily applied to existing crushers without alterations involving great expense and may be arranged in new crushers as they are manufactured in expeditious manner. The simplicity of the arrangement contributes to satisfactory and effective dust exclusion while precluding unnecessary wear tending to the early destruction of the crusher operating members.

It should be understood that it is not intended to limit the invention to the exact details of construction and of operation shown or described for various modifications within the scope of the subjoined claims may occur to persons skilled in the art to which the invention appertains.

It is claimed and desired to secure by Letters Patent:

1. A sealing means, comprising a stationary bearing, a shaft journaled in said bearing for rotational movement and for limited axial movement, means for gyrating said shaft about a fixed fulcrum point, a flexible frusto-conical curtain connected at its small end to said shaft, the apex of said curtain, in its unstressed condition, substantially coinciding with said fulcrum point, and means attached to the large end of said curtain and having rotatable and axially slidable connection with said bearing.

2. A sealing means, comprising a shaft, mechanism supporting said shaft for eccentric and rotational movement and for limited axial movement, means for gyrating said shaft about a fixed fulcrum point, a frusto-conical shaped flexible curtain having its small end rigidly connected to said shaft, the apex of said curtain, in its unstressed condition, substantially coinciding with said fulcrum point, and means associated with the large end of said curtain for effecting axially slidable and rotatable connection with said shaft supporting mechanism.

3. In a gyratory crusher, a crushing head having a shaft, an eccentric for operating said shaft, a fixed bearing for said shaft, a fixed bearing for said eccentric, said arrangement providing a fulcrum point for the gyratory movements of the head removed from said eccentric bearing, and a seal means between the head and a fixed portion surrounding said eccentric, said seal means including a flexible annular curtain, said curtain being so formed and arranged within the crusher that each of its diametrically opposed longitudinal line elements, those considered for the moment as being in neutral positions, is approximately colinear with a line drawn from the fulcrum point to said line element concerned.

4. In a gyratory crusher, the combination with a frame carrying a stationary annular member and a movable crushing member, of means mounted in said frame for gyrating said movable crushing member within said stationary, annular member about a fixed fulcrum point, and means for excluding dust from said gyrating means comprising a flexible curtain encircling said gyrating means and having in its unstressed condition the shape of a hollow frustum of a cone having its apex at the fulcrum point of said movable crushing member, means securing one end of said curtain to one of said members in dust tight manner, and means associated with the other end of said curtain and forming a rotatable and slidable sealing connection between said curtain and the other of said members.

5. In a gyratory crusher, the combination with a frame carrying a stationary crushing member and a movable crushing member comprising a shaft, of means mounted in said frame for gyrating said movable crushing member within said stationary crushing member about a fixed fulcrum point, a stationary imperforate bearing housing carried by said frame and enclosing said gyrating means and comprising an open cylindrical member at the top of said housing, and means for excluding dust from said gyrating means comprising a flexible curtain encircling said shaft and in its unstressed condition having the shape of a hollow frustum of a cone having its apex substantially at the fulcrum point of said movable crushing member, means securing the upper end of said curtain in dust tight manner to said movable crushing member, and a rigid cylindrical sleeve attached to the lower end of said curtain and rotatably and slidably sealing with said stationary cylindrical member.

6. A structure as recited in claim 5 in combination with means for forcing grease to pass between said sleeve and said cylindrical member in direction opposite to that in which dust might enter said gyrating means.

7. In a gyratory crusher, the combination with a frame carrying a stationary crushing member and a movable crushing member comprising a shaft, of means mounted in said frame for gyrating said movable crushing member within said stationary crushing member about a fixed fulcrum point, an open stationary imperforate bearing housing carried by said frame and enclosing said gyrating means, and means for excluding dust from said gyrating means comprising a flexible curtain encircling said shaft and having in its unstressed condition the shape of a hollow frustum of a cone having its apex at the fulcrum point of said movable crushing member, means securing the lower end of said curtain in dust tight manner to the top of said housing, and means associated with the upper end of said curtain and forming a rotatable and slidable sealing connection with the lower side of said movable crushing member.

8. A structure as recited in claim 7 in combination with means for maintaining a quantity of grease between said means at the upper end of said curtain and the lower side of said movable crushing member to flow therebetween in direction tending to oppose the entrance of dust.

RAY C. NEWHOUSE.
GEORGE F. DE WEIN.